March 23, 1954  S. A. STEVENS ET AL  2,673,288
REFLECTOR FOR THE PRODUCTION OF LIGHT BEAMS
Filed Oct. 12, 1949  2 Sheets-Sheet 1

INVENTORS
Sydney Arthur Stevens and
Edward Alfred Sheppard
BY
THEIR ATTORNEY

INVENTORS
Sydney Arthur Stevens and
Edward Alfred Sheppard
BY
THEIR ATTORNEY

Patented Mar. 23, 1954

2,673,288

UNITED STATES PATENT OFFICE 2,673,288

REFLECTOR FOR THE PRODUCTION OF LIGHT BEAMS

Sydney Arthur Stevens and Edward Alfred Sheppard, King's Cross, London, England, assignors to Westinghouse Brake and Signal Company Limited, London, England Application October 12, 1949, Serial No. 120,842

Claims priority, application Great Britain October 12, 1948

2 Claims. (Cl. 240—41.36)

This invention relates to reflectors for optical systems for the production of a beam of light.

Optical systems which produce a concentrated light beam from a source of light of relatively low power are extensively used, for example, for motor vehicle headlights and for traffic controlling signals such as are used on railways. Such systems may be reflector systems, lens systems or a combination of the two. In each case the source of light, which is usually the specially designed concentrated filament of an electric lamp, is placed at the focal point of the system so that the resulting light beam is a substantially parallel beam. Reflector systems of this nature usually comprise a so-called parabolic reflector with a cover glass protecting its open end. Lens systems comprise one or more lenses, sometimes with a suitable reflector arranged behind the light source, so designed as to produce a beam of light of the desired concentration. Known systems of this kind suffer from the disadvantage that the reflecting and refracting surfaces have to be kept clean and also that considerable depth of space is required to house the reflector and/or the lenses.

It is the object of this invention to provide an optical system for the production of a beam of light in which the above mentioned disadvantages are considerably reduced.

According to the invention a plate of transparent material is provided one surface of which is formed in a series of steps and risers, the risers being radial from a common centre and the steps being rendered internally reflecting and so formed that light from a light source situated at the common centre is reflected from the steps as a beam.

The invention thus enables an optical system to be provided which comprises, besides the light source, but one single reflector unit the depth of which can be reduced to the minimum that is compatible with the problem of manufacture and the housing of the necessary source of light. Furthermore there is but one surface which requires to be kept clean, namely the surface through which the beam finally emerges.

The invention is illustrated, by way of example, in the accompanying drawings of which:

Figure 1:
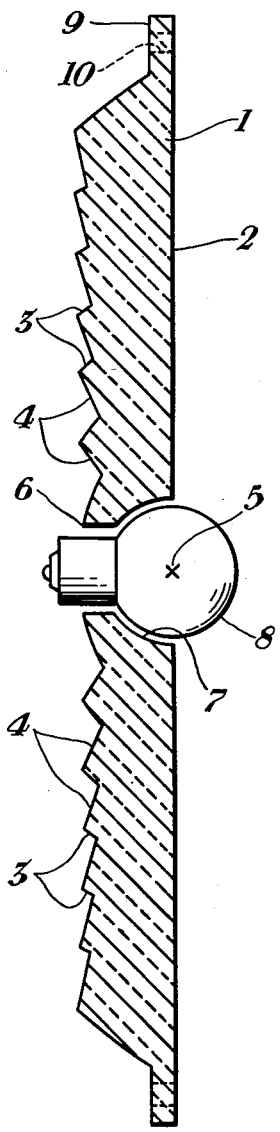
Figure 1 is a sectional view, somewhat diagrammatic, of one form of the invention suitable for an automobile headlamp.
Figure 2:
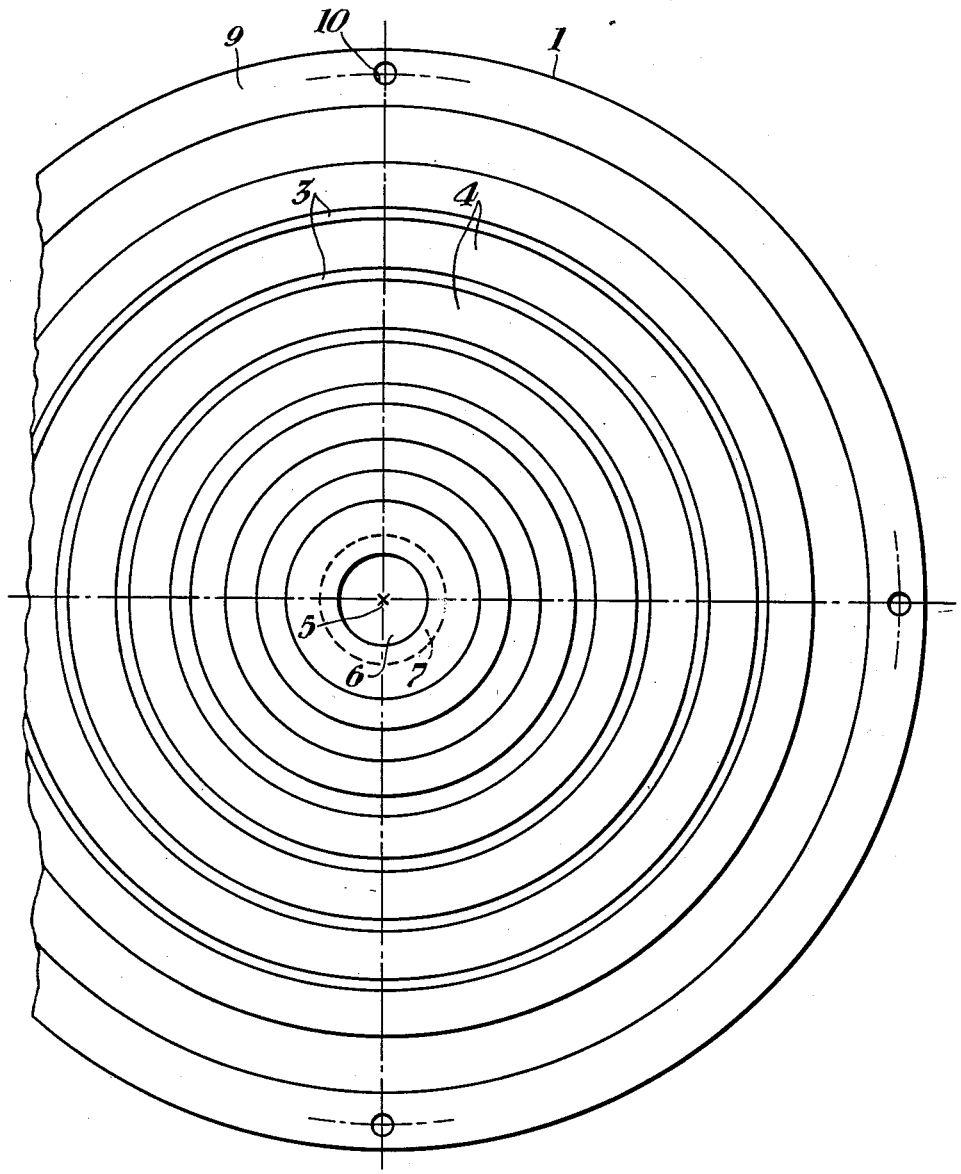
Figure 2 is an elevation of the moulded plate of Figure 1 as viewed from the left of Figure 1.

Referring now to Figures 1 and 2, an optical system comprises a moulded circular disc 1 of transparent material, which may be the plastic material known by the registered trade-mark "Perspex," having a flat front surface 2 and a rear surface formed in a series of concentric steps 3 and risers 4. The steps 3 are mirrored in such a way as to render them internally reflecting and form a series of concentric mirrors having a common focal point 5 which preferably lies in the plane of the surface 2. The contour of each of the steps 3 is preferably parabolic and the risers 4 are drawn radially from the focal point 5. A flange, or rim, 9 is provided having holes 10 therein for mounting the disc in a suitable holder.

An axial circular hole 6 is formed through the middle of the disc of sufficient diameter to accommodate a lamp holder to take a standard automobile headlamp blub. This hole is opened out into a spherical recess 7, with its centre at the focal point 5, of a suitable size to accommodate the glass envelope 8 of the headlamp bulb, the arrangement being such that the filament of the bulb is as nearly as possible at the focal point 5. Light from the lamp filament passes into the disc, the rays being normal to the surface of the spherical recess and thus not refracted, and are reflected by the mirrored steps formed on the rear surface of the disc in the form of a substantially parallel beam. A cover glass is preferably provided to protect the bulb and the flat surface of the disc.

It is also advantageous if the portion of the lamp bulb which projects forward of the surface 2 is covered by a spherical mirror having its centre of curvature coincident with the lamp filament, in order to utilise light rays which would otherwise be scattered forwardly. The lamp may be so constructed that its filament is situated at the centre of its spherical glass bulb, in which case the bulb itself may conveniently be rendered internally reflecting by being "silvered" by any suitable method over that half which projects beyond surface 2.

In order to give a substantially parallel beam, the steps should be of parabolic contour but, provided they are kept narrow, they may be made conical if a small degree of divergence is not objectionable and it will be evident that the greater the number of steps the more even will be the illumination of the beam.

If it is desired that the beam, or a portion thereof, be more widely divergent, suitable deflecting ribs or prisms may be provided on the cover glass in well known manner, or they may be moulded on the un-stepped surface of the disc. Alternatively, the steps may be distorted or arranged so that their focal points do not quite coincide with each other.

Figure 3:
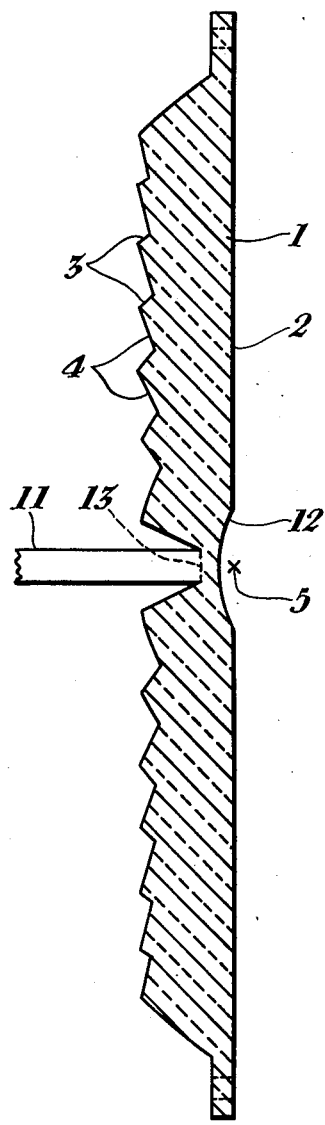
Figure 3 is a sectional view of a modification.

Referring now to Fig. 3, the invention is here illustrated in a form applicable to an optical system for signals as described in a co-pending application Serial No. 102,782, filed by Leslie Hurst Peter and ourselves on July 2, 1949, now U. S. Patent No. 2,589,569, issued March 18, 1952. The moulded circular disc 1 has formed integral therewith a light guide 11 the exit end 13 of which emerges into the stepped surface of the disc at the center thereof. The other, or entrance end of the light guide may be adapted to be supplied with light of one or other of a number of different colours in a manner described in our aforesaid co-pending application. In the flat surface 2 of the disc, co-axial with the exit end of the light guide, is formed a mirrored spherical recess 12. The curvature of the recess 12 is such that the virtual image of the exit end 13 of the light guide formed by the spherical convex mirror constituted by the mirrored recess 12, coincides with the common focal point 5 of the parabolic steps 3. This image, when the light guide is supplied with light, forms the source of light for the system of the invention.

What we claim is:

1. A reflector for an optical system comprising a plate of transparent material having one surface formed in a series of concentric steps and risers, said steps being internally reflective and of parabolic contour having a common focal point, said risers being radial from said focal point, and said focal point being in the plane of the other surface of said plate.

2. A reflector for an optical system comprising a plate of transparent material having one surface formed in a series of concentric steps and risers, said steps being internally reflective and of parabolic contour having a common focal point in the plane of the other surface of said plate, said risers being radial from said focal point, and a source of light at said focal point, the light rays of said source being reflected from said steps in a substantially parallel beam.

SYDNEY ARTHUR STEVENS.
EDWARD ALFRED SHEPPARD.

References Cited in the file of this patent

UNITED STATES PATENTS

| Number | Name | Date |
|---|---|---|
| 1,199,071 | Heckert | Sept. 26, 1916 |
| 1,341,674 | Rhodin | June 1, 1920 |
| 1,399,973 | Limpert | Dec. 13, 1921 |
| 1,464,270 | Remark | Aug. 7, 1923 |
| 1,570,503 | Kralicek | Jan. 19, 1926 |
| 1,903,417 | Grant | Apr. 11, 1933 |
| 2,418,195 | Rolph | Apr. 1, 1947 |
| 2,589,569 | Peter et al. | Mar. 18, 1952 |

FOREIGN PATENTS

| Number | Country | Date |
|---|---|---|
| 334,891 | Great Britain | Sept. 10, 1930 |